United States Patent [19]

Slovinsky et al.

[11] Patent Number: 4,931,347

[45] Date of Patent: Jun. 5, 1990

[54] TRANSLUCENT PRESSURE-SENSITIVE ADHESIVE SYSTEMS

[75] Inventors: Manuel Slovinsky, Sao Paulo, Brazil; Jeffrey R. Tarizzo, Ann Arbor, Mich.

[73] Assignee: Nalco Chemical Company, Naperville, Ill.

[21] Appl. No.: 245,511

[22] Filed: Sep. 19, 1988

[51] Int. Cl.$^5$ .............................. B32B 5/16; C09J 7/02
[52] U.S. Cl. ..................................... 428/192; 428/214; 428/215; 428/220; 428/338; 428/343; 428/354; 428/355
[58] Field of Search ................. 428/343, 355, 356, 40, 428/325, 308, 345, 313, 9, 311.1, 192, 214, 215, 220, 338, 354; 427/208.4, 54.1; 156/71, 230; 204/159.12, 159.14; 206/69

[56] References Cited

U.S. PATENT DOCUMENTS

| | | | |
|---|---|---|---|
| Re. 24,906 | 12/1960 | Ulrich | 206/59 |
| 2,753,285 | 7/1956 | Pahl et al. | 428/354 X |
| 2,907,682 | 5/1958 | Eichel | 428/355 |
| 2,925,174 | 2/1960 | Stow | 206/59 |
| 2,956,904 | 10/1960 | Hendricks | 428/345 |
| 3,314,538 | 4/1967 | Erwin | 156/71 |
| 3,328,194 | 6/1967 | Kasper | 427/54.1 |
| 3,331,729 | 7/1967 | Danielson et al. | 428/40 |
| 3,502,497 | 8/1967 | Crocker | 428/311.1 |
| 3,661,618 | 5/1972 | Brookman et al. | 427/44 |
| 3,690,937 | 9/1972 | Guse et al. | 427/208.4 |
| 3,725,115 | 4/1973 | Christenson et al. | 428/355.2 |
| 3,729,338 | 4/1973 | Lehmann et al. | 428/355 |
| 3,772,063 | 11/1973 | Fukukawa et al. | 427/208.4 |
| 3,840,448 | 10/1974 | Osborn et al. | 204/159.14 |
| 4,038,454 | 7/1977 | Lehmann et al. | 428/356 |
| 4,049,483 | 9/1977 | Loder et al. | 156/230 |
| 4,181,752 | 1/1980 | Martens | 427/54.1 |
| 4,223,067 | 9/1980 | Levins | 428/308 |
| 4,243,500 | 1/1981 | Glennon | 204/159.12 |
| 4,415,615 | 11/1983 | Esmay et al. | 428/40 |
| 4,612,242 | 9/1986 | Vesley et al. | 428/313.9 |
| 4,666,771 | 5/1987 | Vesley et al. | 428/325 |

FOREIGN PATENT DOCUMENTS 675420 1/1966 Belgium .

*Primary Examiner*—Thomas J. Herbert
*Attorney, Agent, or Firm*—Joan I. Norek; Robert A. Miller; Donald G. Epple

[57] ABSTRACT

An adhesive system having a pressure-sensitive adhesive matrix and dispersed therein particulate solids wherein the adhesive system has a light transmission within the range of 15 to 80 percent transmission, and preferably 25 to 75 percent transmission. The adhesive system may include a coating of unfilled pressure sensitive material. The particulate solids preferably have a particle size no greater than 300 microns, and may be organic particulate solids, preferably certain polymeric compositions.

18 Claims, No Drawings

TRANSLUCENT PRESSURE-SENSITIVE ADHESIVE SYSTEMS

TECHNICAL FIELD OF THE INVENTION

The present invention is in the technical field of pressure sensitive adhesives, and in particular supported pressure sensitive adhesive systems.

BACKGROUND OF THE INVENTION

Pressure sensitive adhesives are widely used for a multitude of purposes, such as various sealing and attachment applications. Many attachment applications utilize supported adhesive systems, which generally are comprised of a support material, formed as a sheet or elongated tape, which is faced, often on both sides, with adhesive coating. For bonding together paper sheets or the like a relatively thin support material, such as a plastic film, generally suffices. For bonding larger objects, or where the surfaces being bonded together, or one of them, is contoured or uneven or textured, supported adhesive systems having a more substantial thickness are generally more suitable. The thickness of the system, together with some degree of elasticity, provides some conformity of the sheet or tape to the surfaces being bonded, permitting the adhesive coating to more universally contact such surface(s) along the entire length and breadth of the sheet or tape being applied.

Many applications require a relatively thick adhesive system that is also extremely durable, such as the automotive industry trend towards use of pressure sensitive adhesive tapes for attachment of automotive trim items such as vehicle side moldings, insignia, and the like, instead of mechanical attachments that require vehicle body perforations, because such perforations may lead to corrosion problems. In addition, the use of pressure-sensitive adhesive bonding for such automotive applications, if it can be applied with reasonable ease, permits selection and application of trim items after the vehicle leaves the manufacturer. Given the stresses normally placed on such trim items over years of vehicle use, durability of the form of attachment is extremely important.

U.S. Pat. No. 4,233,067 discloses a pressure-sensitive adhesive tape having a thickness exceeding 0.2 mm which contains a filler of glass microbubbles within the adhesive material matrix, as an improvement with respect to durability and cost regarding relatively thick adhesive systems. Such tapes may have unfilled adhesive coatings, and the adhesive material(s) are polymeric composition, ideally formed by ultraviolet light initiated polymerization in the presence of the filler. In such polymerizations, the polymerizable mixture and microbubbles must be sufficiently transmissive to ultraviolet light.

In the automotive industry, and other industries using relative thick pressure-sensitive adhesive systems for attachment purposes, it is considered very desirable to conceal the presence of adhesive tape or sheet. For instance, when used to attach automotive trim items, the edge of the adhesive system is generally exposed, and hence tapes having a camouflaging color are highly desirable. The best camouflage by virtue of color would of course be a color that matches the trim item being attached or the surface to which it is attached. Automotive vehicles are produced with a multitute of body colors, and trim items may also be used of an unlimited variety of colors, although the most often used color for side-moldings and the like is black. A significant disadvantage inherent in adhesive tapes having a glass microbubble filler is that, by virtue of optical effects, the color of such tapes is white. Moreover, if produced by ultraviolet light initiated polymerization, only a small amount of carbon black, the typical substance used to impart a black color to a pressure-sensitive adhesive system, may be incorporated into the tape because carbon black interferes with such polymerization method. It is believed that at best, using ultraviolet light initiation of the polymerization, only a grey color can be achieved by the incorporation of carbon black to the extent possible.

U.S. Pat. No. 4,612,242 discloses a glass microbubble filled pressure sensitive adhesive tape, the appearance of which is darkened by coating the microbubbles, prior to incorporation into the system, with a thin-film of, for instance, silver, wherein such coating is sufficiently thin not to unduly inhibit polymerization of the adhesive matrix by ultraviolet light techniques. U.S. Pat. No. 4,666,771 discloses a glass microbubble filled pressure sensitive adhesive tape with a darkened appearance by virtue of using stained glass microbubbles and adding a pigment or dye to the adhesive matrix, which requires for photopolymerization that the stained glass microbubbles have an ultraviolet light window. These techniques to darken a glass microbubble filled adhesive tape are significantly elaborate and thus believed to require sophisticated and expensive manufacturing procedures.

It is an object of the present invention to provide a pressure-sensitive adhesive system that provides a color-camouflage type of concealment without elaborate manufacturing techniques. It is an object of the present invention to provide such a system that may be formed using ultraviolet light initiation of the polymerization in the presence of the filler. It is an object of the present invention to provide such an adhesive system that does not compromise the durability of bonding provided generally by filled pressure-sensitive adhesive taped. These and other objects and advantages of the present invention are described below.

DISCLOSURE OF THE INVENTION

The present invention provides an adhesive system comprising at least a pressure-sensitive adhesive matrix and, dispersed therein, particulate solids, wherein the system has a light transmission within the range of from 15 to 80 percent, and preferably of from 25 to 75 percent, and more preferably of from 30 to 65 percent. The present invention provides such an adhesive system further including a coating of unfilled pressure sensitive adhesive material along at least one side of such filled matrix. The present invention provides such adhesive systems wherein the particulate solids have a particle size of no greater than 300 microns, and preferably no greater than 225 microns. The present invention provides such adhesive systems wherein such particulate solids do not unduly interfere with ultraviolet light polymerization initiation. The present invention provides such adhesive systems wherein such particulate solids are incorporated into such filled matrix, or support material, in the amount of from 5 to 25 weight % based on the total weight of such support material, and preferably from 5 to 15 percent, same basis. The present invention provides such adhesive systems, which may be formed as sheets or elongated tapes, or the like, having a thickness of from 25 to 60 mils, and preferably from 35 to 50 mils, including any unfilled adhesive coating(s) laminated to the support material. The present invention provides such adhesive systems wherein the unfilled adhesive coating(s) on the filled support material have a thickness of from 0.5 to 10 mils, and preferably from 1 to 6 mils. The present invention, in preferred embodiment, provides such an adhesive system formed as a three-layer laminate, having a layer of such filled support material faced on both sides with a pressure-sensitive unfilled adhesive coating. The present invention provides such adhesive systems wherein such particulate solids are substantially organic particulate solids, and in preferred embodiment wherein such organic particulate solids are polymers derived from ethylenically-unsaturated monomers, which polymers are comprised of at least 60 mole percent of, and more preferably at least 80 mole percent of, units having the structure of Formula I:

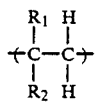

Formula I wherein $R_1$ is hydrogen or methyl, and $R_2$ is a polar group such as hydroxy, nitrile, carboxylic acid, carboxylic acid ester, carboxylic acid amide, N-substituted derivatives of carboxylic acid amide, and the like, and mixtures thereof. In preferred embodiment the polymer is comprised of at least 90 mole percent of units of the Formula I wherein such units are substantially those in which $R_2$ is carboxylic acid amide or a mixture of such units in which $R_2$ is carboxylic acid and carboxylic acid amide. In further preferred embodiment, such particulate solids are substantially a polymer derived from acrylamide, including acrylamide homopolymers and anionic acrylamide polymers such as partially hydrolized polyacrylamides.

The particulate solids preferably are selected from those that are divisible into particles of the appropriate particle size at use temperature. In certain embodiments of the invention, where the adhesive system is formed at least partially by the U.V. initiation of polymerization in the presence of the particulate solids, for instance for the polymerization of prepolymerized material as described in more detail below, the particulate solids should be insoluble in the prepolymerized material and must not interfere with the completion of the polymerization. Such aspects of the present invention are met by the preferred embodiments wherein the particulate solids are substantially polyacrylamide derived polymers.

PREFERRED EMBODIMENTS OF THE INVENTION

As will be demonstrated in certain of the Examples below, adhesive systems of the present invention are translucent and give the appearance of having the same color as adjacent background structures. Hence they provide color-camouflage properties not by being manufactured with dies or pigments or other color-producing agents but by their translucency provide the optical effect of acquiring, in use, the most advantageous camouflage color, that is the color(s) of the objects being bonded. Production of the adhesive system of the present invention requires no further techniques than the production of any filled pressure-sensitive adhesive system, and the often advantageous technique of ultraviolet light initiation of polymerization in the presence of the filler may be used.

Below is a detailed description of a suitable adhesive system incorporating the particulate solids of the present invention, and further there is demonstrated for such embodiment the durability of the bonding provided thereby. The present invention, however, is believed applicable to adhesive systems regardless of the adhesive material utilized, and the extent of durability provided thereby, where a filler is desirable, and particularly where a filler that provide color-camouflage is desired.

The polymers of the adhesive system of the present invention are generally cross-linked polymers having at least a degree of pressure sensitive adhesiveness. Such polymers preferably may be formed in major part from a combination of acrylic acid esters and ethylenically-unsaturated monomers containing at least one polar moiety. The acrylic acid ester monomers are preferably acrylic acid esters of alcohols having from 1 to 14 carbon atoms, which alcohols may be primary or secondary, and the carbon chains thereof may be linear, branched, cyclic, heterocyclic, or aromatic, and may be further substituted. Such alcohols preferably do not contain a linear carbon chain of greater than 10 carbon atoms, and more preferably do not contain a linear chain of greater than 8 carbon atoms. The acrylic acid ester monomers should be, in major portion, chosen from those that provide pressure sensitive adhesive properties to the polymer, such as acrylic acid esters formed from such alcohols as n-butanol, isobutanol, n-pentanol, isopentanol, 2-methylbutanol, 1-methyl pentanol, 3-methyl pentanol, 2-ethyl butanol, 3-heptanol, 3,5,5-trimethylhexanol, isooctanol, 2-ethylhexanol, 3-ethylhexanol, 4-ethyl-heptanol , 4-methyloctanol, isodecyl alcohol, and the like and which often are alcohols having at least 4 carbon atoms. In further preferred embodiment the acrylic acid ester monomers are, in major portion, a combination of acrylic esters chosen from those formed from low carbon atom containing alcohols and higher carbon atom containing alcohols from among those acrylic acid esters that provide pressure sensitive adhesive properties to the polymers. In further preferred embodiment the polymer(s) of the adhesive system are comprised of from 55 to 95 mole percent, and more preferably from 65 to 90 mole percent, of acrylic acid esters of $C_{4-10}$ primary or secondary alcohols, and more preferably those alcohols that do not contain linear carbon atom chains of greater than 8 carbon atoms. In more preferred embodiment, wherein the polymer(s) are comprised of from 55 to 95 mole percent of acrylic acid esters of $C_{4-10}$ primary or secondary alcohols, such esters of $C_{4-6}$ alcohols comprise from 45 to 70 mole percent of the units of such polymer and such esters of $C_{7-10}$ alcohols comprise from 10 to 30 mole percent of the units of such polymer. In more preferred embodiment, wherein the polymer(s) are comprised of from 65 to 90 mole percent of acrylic acid esters of $C_{4-10}$ primary or secondary alcohols, such esters of $C_{4-6}$ alcohols comprise from 50 to 70 mole percent of the units of such polymer, and such esters of $C_{7-10}$ alcohols comprise from 15 to 25 mole percent of such units of such polymer.

The term "unit", as used herein with respect to a unit or units of a polymer having a carbon-to-carbon chain backbone, is a segment of the polymer containing two adjacent backbone carbons, and thus for polymers of ethylenically-unsaturated monomers is a segment formed of a given monomer molecule.

The ethylenically-unsaturated monomers having a polar moiety incorporated into the polymer(s) of the adhesive system include such monomers as acrylic acid, itaconic acid, maleic anhydride, B-carboxyethylacrylate, acrylamide, acrylonitrile, cyanoethylacrylate, hydroxyalkylacrylates, N-substituted acrylamides, similar methacrylic monomers, and the like. Such polar moiety-containing monomers may be incorporated into the polymers of the present adhesive system in the amount of from 5 to 45 mole percent of the units of such polymer(s), and in preferred embodiment from about 15 to 25 mole percent.

Given commercial considerations, such as availability and cost, and further given the advantageous properties provided the adhesive system as shown below in the Examples, an advantageous polymer for both the filled support material and the unfilled coating of the present adhesive system is a polymer having from about 55 to 65 mole percent butyl acrylate, from 15 to 25 mole percent 2-ethylhexylacrylate, and from 15 to 25 mole percent acrylic acid.

As mentioned above, such polymer(s) are generally cross-linked and particularly suitable as cross-linking agents are molecules having a plurality of ethylenically-unsaturated sites capable of polymerization with other monomers being incorporated into the polymer(s). Of such type of agents, di- and triacrylates, such as 1,6-hexanediol diacrylate, are particularly suitable. The polymers can of course be cross-linked with other types of cross-linking agents, such as those that react with a plurality of the polymer's pendant functional groups, bridging same, or the incorporation into the polymer of small amounts of monomers having coreactive groups. When simple agents, such as 1,6-hexanediol diacrylate, are used, the amount of cross-linking agent desired in a given formulation is generally about from 0.005 to 0.5 weight percent, based on total weight of polymer, and preferably about 0.01 to 0.2 weight percent. Less triacrylate cross-linking agent is generally desirable in comparison to a diacrylate.

The adhesive of the support material and that of the adhesive coating of the adhesive system of the present invention may be of the same or similar or dissimilar compositions, and may have the same or similar or dissimilar degrees of cross-linking. In preferred embodiment the polymers of the support material and adhesive coatings are of similar composition. Where such polymers are comprised of acrylic acid esters polymerized together with polar moiety-containing ethylenically-unsaturated monomers, in preferred embodiment the support material has a higher degree of cross-linking than the adhesive coatings thereon, and in further preferred embodiment the adhesive coating polymer has a greater mole percent of the polar moiety-containing monomer than the support material, and such preferred distinctions are applicable as preferred embodiments regarding the advantageous butyl acrylate, 2-ethylhexyl acrylate acrylic acid polymers discussed above.

The support material of the adhesive system of the present invention may be formed by extruding a combination of polymer and filler, by casting from a solvent that contains the polymer (dissolved) and the filler, or by U.V. initiated polymerization of a monomer blend, or prepolymerized monomer blend, containing the filler. The adhesive coating may be formed by similar methods. In preferred embodiment both the support material and adhesive coating(s) are formed by U.V. initiated polymerization, generally as follows. The desired monomers, exclusive of the cross-linking agent, in the presence of a photoinitiator, are first prepolymerized to a degree sufficient to provide a flowing mass of convenient viscosity, and then transferred to an apparatus for completion of the polymerization, with the addition of cross-linking agent and generally additional photoinitiator, whereat the viscous prepolymerization material, together with such additives, and for the support material the filler also, is sandwiched between two sheets, both of which are release coated, and at least one of which transmits U.V. light and the material is held between such sheets at the desired thickness, while exposed to U.V. radiation for completion of the polymerization. For the adhesive coating(s), one of the sheets preferably is a preformed sheet of the support material, and hence the adhesive coating's prepolymerization material is in direct contact with the surface of the support material during completion of the coating's polymerization. Such preferred method of forming the adhesive system of the present invention is described more fully below in Examples 1 and 2.

Such polymerizations are conducted in the absence of oxygen, which condition can be provided by purging the atmosphere over the polymerization mixture with nitrogen, and when a prepolymerized material is sandwiched between surfaces such technique itself sufficiently eliminates oxygen.

In Examples 1 and 2 below there is prepared an adhesive system containing an anionic polyacrylamide filler. As to embodiments with polyacrylamide fillers, a preferred embodiment of the present invention includes as a filler a polyacrylamide that is from 0 to 80 mole percent hydrolyzed, which range includes an acrylamide homopolymer (0 mole percent hydrolyzed) to an acrylic acid/acrylamide copolymer having an 80/20 mole ratio (80 mole percent hydrolyzed) which may also be designated an 80 mole percent anionic polyacrylamide. In more preferred embodiment, such filler is a 5 to 45 mole percent hydrolyzed polyacrylamide.

The following are descriptions of the test procedures used in some of the Examples. Add adhesive systems were tested as strips or tapes comprised of the support material coated on both sides with the nonfilled adhesive coating. Such tapes are about 12.7 mm wide. The testing was conducted at room temperature unless states otherwise.

PEEL TEST

A strip of the adhesive system tape (about 150 mm in length) is applied to a primed polyvinyl chloride bar (test bars using XP11-289-A1, Lynn Plastic, The Standard Products Company, Dearborn, Mich.) shaped so that it can be gripped by a Tester for pulling away from a painted plate, followed by one pass of a 6.8 kg weighted roller on the tape side. The liner is then removed from the tape and the tape, with PVC bar, is applied to a steel plated coated with an exterior finish automotive paint, followed by two passes (in the same direction) on top of the PVC bar with a 6.8 kg. weighted roller. The Tester is designed for a 90° pull angle upon displacement of a moving platform to which the steel plate is attached. The grip moves at a speed of about 12 inches per minute. The Tester includes a recorder which records force versus the distance travelled. In this test two parameters are determined. First is the force needed to start the breaking of the bonding the polyvinyl chloride ("PVC") bar to the steel plate, which is called the "breakaway" force. The other parameter is the force needed to continue the breaking of the bond along the length of the bond after initial breaking, which is called the "continuous" force.

PLUCK TEST

The pluck test differs from the peel test generally in that only about a one inch length of adhesive system tape is used and hence only a one inch segment of the PVC bar is bonded to the steel plate. Only one parameter is determined, which is the force required to pluck the PVC bar away from the steel plate. The pull of the Tester is again at about a 90° angle and the grip is displaced at a speed of about 2.5 cm per minute.

The tensile strengths of the adhesive system tapes were determined using the ASTM D412 test procedure. In some instances, the adhesive system was tested only after a period of "dwell", whereby the steel plate and PVC bar were bonded together with the adhesive system tape and then left so bonded for a period of time before tested. Such dwell may be at room temperature or other than room temperature, the latter to determine the effect of such temperature of bond strength. Similarly the tests can be conducted at room temperature or at other than room temperature.

The above described tests are particularly appropriate for determining the adhesion and durability of the adhesive system for the purposes of its use for attaching automotive exterior trims. In addition, such tests demonstrate the adhesion and durability of the bond provided by the adhesive system generally, and further the advantageous improvement in properties provided by the filler incorporated into the support material of the system.

EXAMPLE 1

To an erlenmeyer flask was charged a mixture for preparing a prepolymerized material, which mixture, in parts by weight, was 60 parts butyl acrylate, 30 parts 2-ethylhexylacrylate, 10 parts acrylic acid, and as a photoinitiator 0.2 parts benzoin i-propyl ether. The flask was equipped with a magnetic stirring bar and purged with nitrogen. Thereafter during the entire prepolymerization procedure a nitrogen blanket was maintained over the reaction mixture. The flask was placed on a magnetic stirrer to provide stirring during the prepolymerization procedure. UV radiation was provided by a long wave lamp, Spectronic XX-15N equipped with two 15 watt tubes, positioned at the side of the flask, and the irradiation was continued until the charge reached a viscosity of about 3,000 cps, as Brookfield viscosity. To this prepolymerized material was added 10 parts by weight filler, 0.08 parts by weight of 1,6-hexanediol diacrylate, and 0.3 parts by weight benzoin i-propyl ether. This prepolymerized material, with the filler substantially homogenously dispersed therein, was sandwiched between two plates of Pyrex glass. The Pyrex glass was lined on the surface in contact with the mixture with release-treated Mylar film. The thickness of the sandwiched prepolymerized material layer was determined by spacers that held the glass plates in spaced-apart relationship. In this Example the thickness of the prepolymerized material layer, and hence the end matrix, was 35 mils. Air was eliminated from the system. The sandwiched prepolymerization material, containing the filler, further photoinitiator, and the diacrylate cross-linking agent, was then subjected to further irradiation from two UV sources which were lamps similar to that described above for the preparation of the prepolymerization material, which lamps were disposed above and below the glass plates at a distance of about one inch each. The exposure to the UV radiation continued 15 minutes, after which time the polymerization was completed. The glass plates were removed, leaving the polymerized layer lined with the mylar film on both sides to facilitate handling thereafter. The polymerized 35 mil. thick film, comprised of a cross-linked polymer having about 61 mole percent butyl acrylate units, 21 mole percent 2-ethylhexylacrylate units, and 18 acrylic acid units, in which is substantially homogeneously dispersed 9.5 wt. % filler. This film is suitable for cutting into any desired shape for use as a support layer for the adhesive system of the present invention. The filler was a 40 mole percent anionic polyacrylamide sieved through a 212 micron mesh sieve.

EXAMPLE 2

To an erlenmeyer flask was charged a mixture for preparing a prepolymerized material, which mixture, in parts by weight, was 58.7 parts butyl acrylate, 29.3 parts 2-ethylhexylacrylate, 12 parts acrylic acid, and 0.2 parts benzoin i-propylether. The prepolymerization was conducted as described above in Example 1, again irradiating the mixture until a Brookfield viscosity of about 3,000 cps was reached. To this prepolymerization material was added, with stirring, 0.05 parts by weight of 1,6-hexanediol diacrylate and 0.2 parts benzoin i-propylether. The prepolymerized material, with additional photoinitiator and crosslinking agent, was coated onto a strip of support material cut from the film produced in Example 1 above. Such coating was effectuated by dipping the strip of support material into the prepolymerized material and then holding the strip in an elevated position for several minutes to permit excess prepolymerized material to drain off. The coated support material was then placed between two glass Pyrex plates lined with Mylar film as before. Before dipping the support strip, the prior Mylar film had been removed from the strip after it was cut. For the coated strip, no spacers were used, the thickness of the strip with coating determining the distance between the plates. The sandwiched coated strip was then irradiated as described above in Example 1 for the second irradiation to complete the polymerization of the prepolymerization. This irradiation was continued for about ten minutes, after which time the polymerization of the nonfilled coating on the support strip was completed. The polymerized coating is a polymer comprised of about 58.4 mole percent butyl acrylate units, 20.3 mole percent 2-ethylhexylacrylate units, and 21.3 mole percent acrylic acid units. In comparison to the polymer of the filled support layer, it has less butyl acrylate units and more acrylic acid units, the amount of 2-ethylhexylacrylate units being about the same, and in addition it is less cross-linked than the polymer of the filled support layer.

EXAMPLE 3

Samples of the adhesive system prepared in Example 2 above were subjected to the Tensile Strength test, the Peel Test, break-away value ("Br") with and without a seven day prior aging at 70° C., and the Pluck Test without a prior aging and then with a seven day prior aging at 70° C. with room temperature and 70° C. pulls. Each of these tests are described above. The test results for Example 2's adhesive system, and a blank that was prepared as described in Examples 1 and 2 except that no filler was incorporated, are set forth below in Table I.

TABLE I

| Test | Test Results (lb) | | |
|---|---|---|---|
| | Blank | Example 2 | Percent Improvement* |
| Tensile Strength | 1.0 | 1.5 | 50.0% |
| Peel (Br) | 33.0 | 44.4 | 22.4% |
| Peel (Br) 7 days/70° C.[1] | 43.0 | 60.0 | 39.5% |
| Pluck | 27.5 | 40.0 | 45.5% |
| Pluck 7 days/70° C.[1] | 53.5 | 66.25 | 23.8% |
| Pluck 7 days/70° C.[2] 70° C. pull | 35.0 | 38.0 | 8.6% |

*Percent Improvement is the percentage increase in the test result of Example 2 over the Blank.
[1]Tested at room temperature.
[2]Tested at 70° C.

The test results set forth in Table I above also demonstrate that the samples subjected to the seven day accelerated aging at 70° C. had higher performance levels in the break-away Peel Test and the Pluck tests of respectively 48.5 percent and 65.5 percent increase, for the samples of Example 2. In comparison, the Blank's performance also improved upon accelerated aging in the respective amounts of 30 and 94.5 percent increase, the aged sample, however, consistently still performing below that of Example's 2 sample.

EXAMPLES 4 to 6

Using the procedures described in Examples 1 and 2 above, and the same support material and coating polymer compositions, four adhesive systems were prepared differing only as to the amount and type of filler incorporated, as set forth below in Table II.

TABLE II

| Adhesive System Designation | Type of Filler | Amount of Filler (parts by weight) |
|---|---|---|
| Blank | none | none |
| Example 4 | 30 mole percent anionic polyacrylamide | 8 |
| Example 5 | acrylamide homopolymer | 12 |
| Example 6 | 98 percent hydrolyzed polyvinyl alcohol | 8 |

In all instances the fillers used were first passed through a 212 micron sieve mesh. Samples of each of these adhesive systems were subjected to the peel test and the pluck test, which tests are described above, and the test results are set forth in Table III below.

TABLE III

| Adhesive System | Peel Test (lb) | | Pluck Test (lb) |
|---|---|---|---|
| | Break-Away | Continuous | |
| Blank | 26.4 | 11.4 | 36.8 |
| Example 4 | 31 | 11.8 | 42.6 |
| Example 5 | 31 | 12.2 | 43.4 |
| Example 6 | 30 | 11.7 | 40.4 |

EXAMPLE 7

Using samples of the adhesive system prepared as described in Examples 1 and 2 above, the effect of passage of time at ambient room temperature, ("dwell") was determined for performance in Peel Test, for dwells of respectively 16 hours and 3 days. The test results are set forth below in Table IV for duplicate tests.

TABLE IV

| Test | Example 2 16 hr. dwell | Example 2 3 day dwell | Percent Improvement* |
|---|---|---|---|
| Peel break-away | 34.3/28.7 | 41.5/40.0 | 30 |
| Peel continuous | 11.5/13.5 | 15.5/13.4 | 18 |

*Percent improvement is the percent increased performance of the sample dwelled three days over that given a 16 hour dwell, based on the average of percent improvement of the duplicate samples.

EXAMPLES 8 to 16

Using the procedures generally of Examples 1 and 2 above, a plurality of tapes, designated Examples 8 to 16, were prepared using various fillers incorporated in varying amounts. In addition, the same type of pressure sensitive tapes were also produced having similar amounts of fillers not within the scope of the present invention, as comparative examples. All fillers used for the Examples were comprised of particles having a particle size up to 212 microns. The fillers used in the comparative examples were the following: polyethylene, Allied Signal Grade B-6, having a 2 to 12 micron particle size; hollow microspheres, Q-Cel 300, from the PQ Corporation, made of sodium borosilicate, having a particle size of 10–180 microns; and silica, Aerosil 200, from Degussa. For each of these tapes, and a blank which was the same type of tape but containing no filler, percent light transmission was determined as follows. The light source used was a 20 watt tungsten lamp (Reichert Scientific Instruments, Model 650, 60 Hz, 26 V.A.C., Blue Filter in place) positioned about 18½ inches above the tap sample. The tape sample in each instance was disposed on a platform over a 7 mm by 13 mm slit. Below such slit at a distance of about 4⅞ inches was placed an exposure meter (General Electric Type DW-68, range 0–70 footcandles, hood removed), which meter enclosed, except for the above-mentioned slit, by a chamber covered on the inside with black paper. The light source to sample and sample to meter distances were adjusted to give the maximum meter reading of 70 footcandles when no sample covered the slit. Room light reaching the meter was adjusted to that there was a zero meter reading when the light source was off and no sample covered the slit. In addition, each tape was then visually observed in conjunction to a bonded substrate to determine its appearance. The results of these determinations are set forth below in Table V. In addition, for each tape tested there is listed in Table V the type of filler, the amount of filler (in phr, or parts by weight based on hundred parts of the adhesive matrix), and the thickness of the tape. Tapes having a very high percentage of light transmission have a visual appearance not of a color, but instead a transparent gap.

TABLE V

| Example # | Filler | Filler Amount (phr) | Thickness (mils) | Transmission Percentage | Appearance |
|---|---|---|---|---|---|
| 8 | acrylamide homopolymer | 8 | 38 | 51 | color of background |
| 9 | acrylamide homopolymer | 10 | 38 | 46 | color of background |
| 10 | acrylamide homopolymer | 12 | 38 | 37 | color of background |
| 11 | 40 mole % anionic polyacrylamide | 8 | 38 | 59 | color of background |
| 12 | 40 mole % anionic polyacrylamide | 10 | 38 | 53 | color of background |
| 13 | 40 mole % anionic polyacrylamide | 12 | 38 | 46 | color of background |
| 14 | polyvinyl alcohol | 8 | 38 | 54.3 | color of background |
| 15 | polyvinyl alcohol | 10 | 38 | 45.7 | color of background |
| 16 | polyvinyl alcohol | 12 | 37 | 41.4 | color of background |
| blank | (no filler) | — | — | 91 | transparent gap |
| — | polyethylene | 6 | 38 | 3.0 | white |
| — | polyethylene | 10 | 38 | 1.1 | white |
| — | polyethylene | 16 | 38 | 0 | white |
| — | hollow microspheres | 12 | 38 | 0 | white |
| — | silica | 8 | 38 | 89 | transparent gap |
| — | silica | 10 | 38 | 89 | transparent gap |
| — | silica | 12 | 42 | 89 | transparent gap |

In the foregoing Examples, all of the adhesive systems were from 37 to 38 mils thick. All of the fillers utilized had a maximum particle size of 212 microns.

INDUSTRIAL APPLICABILITY OF THE INVENTION

The present invention is applicable to the adhesive industry and industries employing bonding materials, such as the automotive industry and the like.

We claim:

1. An adhesive system in the form of a sheet or tape comprising a pressure-sensitive adhesive matrix and particulate solids dispersed in said matrix, said matrix having a thickness of from about 25 to about 60 mils, the improvement in which comprising:
   said particulate solids having a particle size of no greater than 300 microns;
   said particulate solids being present in said matrix in the amount of from about 5 to about 25 weight percent based on total weight of said particulate solids and said matrix; and
   said particulate solids being polymers derived from ethylenically-unsaturated monomers, said polymers being comprised of at least 60 mole percent of units having the structure of Formula I:

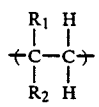

Formula I wherein $R_1$ is hydrogen or methyl, and $R_2$ is a polar group,
   whereby said adhesive system transmits light to the extent of from about 15 to about 80 percent transmission.

2. The adhesive system of claim 1 wherein said particulate solids have a particle size no greater than 225 microns.

3. The adhesive system of claim 1 wherein said pressure-sensitive adhesive matrix includes a coating of unfilled pressure-sensitive adhesive material along at least one side thereof.

4. The adhesive system of claim 3 wherein said adhesive system is formed as a sheet or tape having a thickness of from 25 to 60 mils, including the thickness of said coating of unfilled pressure-sensitive adhesive material, and said coating of unfilled pressure-sensitive adhesive material has a thickness of from 0.5 to 10 mils.

5. The adhesive system of claim 4 wherein said coating of unfilled pressure-sensitive adhesive material has a thickness of from 1 to 6 mils.

6. The adhesive system of claim 5 wherein said adhesive system is a three-layer laminate having said coating of unfilled pressure-sensitive adhesive material along both sides of said matrix.

7. The adhesive system of claim 1 wherein said light transmission range is from 25 to 75 percent transmission.

8. The adhesive system of claim 7 wherein said light transmission range is from 30 to 60 percent transmission.

9. The adhesive system of claim 7 wherein said particulate solids ar present in said matrix in the amount of from 5 to 15 weight percent based on total weight of said particulate solids and said matrix.

10. The adhesive system of claim 7 wherein said sheet or tape has a thickness of from 35 to 50 mils.

11. The adhesive system of claim 7 wherein said polymers are comprised of at least 80 mole percent of said units of said Formula I.

12. The adhesive system of claim 11 wherein said polymer is comprised of at least 90 mole percent of said units of said Formula I, and wherein said up to 100 mole percent of said units are units wherein $R_2$ is carboxylic acid amide, and the remainder of said units are units wherein $R_2$ is carboxylic acid.

13. An adhesive sheet comprising a pressure-sensitive adhesive matrix and particulate solids dispersed in said matrix, said adhesive sheet having a thickness of from about 25 to about 60 mils, the improvement in which comprising:
   said particulate solids having a particle size no greater than 300 microns, said particulate solids being dispersed in said matrix in the amount of from 5 to 25 weight percent based on total weight of said particulate solids and said matrix; and
   said particulate solids being polymers derived from ethylenically-unsaturated monomers, said polymers being comprised of at least 60 mole percent of units having the structure of Formula I:

Formula I wherein $R_1$ is hydrogen or methyl, and $R_2$ is a polar group;

whereby said adhesive sheet transmits light to the extent of from about 25 to about 75 percent transmission.

14. The adhesive sheet of claim 13, further including a coating of unfilled pressure-sensitive adhesive material along at least one side thereof.

15. The adhesive sheet of claim 13 wherein the sheet is formed as an elongated tape.

16. The adhesive sheet of claim 13 wherein said particulate solids have a particle size of no greater than 225 microns.

17. The adhesive sheet of claim 13 wherein said adhesive sheet has a thickness of from 35 to 50 mils and said particulate solids are present in said matrix in the amount of from 5 to 15 weight percent based on total weight of said particulate solids and said matrix.

18. The adhesive sheet of claim 13 wherein said polymer is comprised of at least 90 mole percent of said units of said Formula 1, and wherein up to 100 mole percent of said units are units wherein $R_2$ is carboxylic acid amide, and the remainder of said units are units wherein $R_2$ is carboxylic acid.

* * * * *

UNITED STATES PATENT AND TRADEMARK OFFICE
CERTIFICATE OF CORRECTION

PATENT NO. : 4,931,347
DATED : June 5, 1990
INVENTOR(S) : Manuel Slovinsky et al.

It is certified that error appears in the above-identified patent and that said Letters Patent is hereby corrected as shown below:

In the Abstract, at line 6, delete "untilled" and substitute therefor -- unfilled --.

In Column 5, line 62, after "acrylate" insert -- , --.

In Column 10, line 45, delete "tap" and substitute therefor -- tape --.

In Claim 9, at Column 12, line 33, delete "ar" and substitute therefor -- are --.

Signed and Sealed this

Thirteenth Day of August, 1991

*Attest:*

HARRY F. MANBECK, JR.

*Attesting Officer*      *Commissioner of Patents and Trademarks*